United States Patent
Smith, Jr. et al.

(10) Patent No.: US 7,200,208 B2
(45) Date of Patent: Apr. 3, 2007

(54) METHOD AND SYSTEM FOR PROVIDING COMMUNICATION SERVICES FOR HEARING-IMPAIRED PARTIES

(75) Inventors: James O. Smith, Jr., Marion, IA (US); William A. McClelland, Cedar Rapids, IA (US); Chris R. Heidelbauer, Marion, IA (US)

(73) Assignee: MCI, LLC, Basking Ridge, NJ (US)

( * ) Notice: Subject to any disclaimer, the term of this patent is extended or adjusted under 35 U.S.C. 154(b) by 140 days.

(21) Appl. No.: 10/699,823

(22) Filed: Nov. 4, 2003

(65) Prior Publication Data

US 2005/0094775 A1    May 5, 2005

(51) Int. Cl.
*H04M 11/00* (2006.01)

(52) U.S. Cl. .................... 379/52; 379/93.24; 379/90.01

(58) Field of Classification Search .................. 379/52, 379/93.15, 93.35, 93.09, 93.17, 93.21, 93.34, 379/93.23, 93.24, 90.01, 207.02, 218.02; 704/271, 260; 709/206, 227; 370/352
See application file for complete search history.

(56) References Cited

U.S. PATENT DOCUMENTS

| | | | |
|---|---|---|---|
| 5,680,443 A | 10/1997 | Kasay et al. | |
| 5,745,550 A | 4/1998 | Eisdorfer et al. | |
| 5,787,148 A | 7/1998 | August | |
| 5,809,112 A | 9/1998 | Ryan | |
| 5,959,629 A | 9/1999 | Masui | |
| 5,991,723 A * | 11/1999 | Duffin | 704/260 |
| 6,188,429 B1 | 2/2001 | Martin et al. | |
| 6,389,114 B1 | 5/2002 | Dowens et al. | |
| 6,421,425 B1 * | 7/2002 | Bossi et al. | 379/52 |
| 6,430,602 B1 * | 8/2002 | Kay et al. | 709/206 |
| 6,480,484 B2 * | 11/2002 | Morton | 370/352 |
| 6,603,835 B2 | 8/2003 | Engelke et al. | |
| 6,611,804 B1 | 8/2003 | Dorbecker et al. | |
| 6,628,967 B1 | 9/2003 | Yue | |
| 6,714,793 B1 * | 3/2004 | Carey et al. | 455/466 |
| 6,757,732 B1 * | 6/2004 | Sollee et al. | 709/227 |
| 6,801,613 B1 * | 10/2004 | Hamilton | 379/207.02 |
| 6,914,964 B1 | 7/2005 | Levine | |
| 6,950,500 B1 * | 9/2005 | Chaturvedi et al. | 379/52 |
| 6,950,501 B1 * | 9/2005 | Chaturvedi et al. | 379/52 |
| 2002/0037074 A1 | 3/2002 | Dowens et al. | |
| 2002/0057765 A1 | 5/2002 | Hyziak et al. | |
| 2002/0065820 A1 | 5/2002 | Enns | |
| 2002/0143533 A1 | 10/2002 | Lucas et al. | |
| 2002/0199019 A1 | 12/2002 | Battin et al. | |
| 2003/0072420 A1 | 4/2003 | Feigenbaum | |
| 2004/0024822 A1 * | 2/2004 | Werndorfer et al. | 709/206 |
| 2004/0111268 A1 * | 6/2004 | Steel, Jr. | 704/271 |

FOREIGN PATENT DOCUMENTS

WO    03/021796    3/2003

* cited by examiner

*Primary Examiner*—Stella Woo

(57) ABSTRACT

A method for providing communication services for the hearing-impaired includes establishing a communication link between a hearing-impaired party and a communication assistant. The communication assistant may also establish a voice link with a hearing party. The hearing-impaired party and the communication assistant may then communicate via text messages, such as instant messages. The hearing party may send a voice message to the communication assistant. The communication assistant may then convert the voice message into an instant message and transmit the instant message to the hearing-impaired party. The communication assistant may also convert instant messages received from the hearing-impaired party into voice messages for the hearing party.

33 Claims, 4 Drawing Sheets

METHOD AND SYSTEM FOR PROVIDING COMMUNICATION SERVICES FOR HEARING-IMPAIRED PARTIES

FIELD OF THE INVENTION

The present invention relates to providing communication services and, more particularly, to providing communication services for hearing-impaired parties.

BACKGROUND OF THE INVENTION

A conventional telecommunication device for the deaf/teletype (TDD/TTY) enables people who are hearing-impaired or deaf to communicate with other parties via standard telephone lines. For example, one way in which a deaf party may communicate with another party is if both parties use a TDD. In this case, a calling party may type using a standard keyboard included with the TDD and the called party reads the message on a display associated with his/her TDD. The called party may similarly type a message using his/her TDD and the calling party may read the message using his/her display.

A second way in which a hearing-impaired/deaf person may communicate via standard telephone lines is referred to as relay. In this case, a conference call is established between a first party, a communication assistant (CA) (also referred to as a relay operator) and a second party. The first party may be a deaf person who has a TDD/TTY and the second party may be a person with normal hearing who does not have a TDD/TTY device.

When the deaf party wishes to make a call, he/she dials a telephone number for the CA and tells the CA the telephone number to which he/she would like to be connected. The CA may dial the number and provide a greeting to the hearing party. When the hearing party speaks, the CA types what is said and the deaf party reads the text using the TDD/TTY's display. The deaf party may respond to the message on the display by typing on his/her TDD/TTY. The CA reads what is typed to the hearing party in a normal manner. In this manner, the deaf party may communicate with hearing and hearing-impaired parties over the public switched telephone network using conventional TDD/TTY equipment.

One problem with the communication methods described above is that a TDD/TTY is required in order for the hearing-impaired party to communicate. This may prevent the hearing-impaired party from being able to communicate with others at various times due to the lack of an available TDD/TTY device. For example, if the hearing-impaired party is not at home, the hearing-impaired party may not have access to a TDD/TTY device.

SUMMARY OF THE INVENTION

There exists a need for systems and methods that provide additional ways in which a hearing-impaired party can communicate.

These and other needs are met by the present invention, where a hearing-impaired party may establish a connection to a CA using any conventional device that is able to execute a text messaging program, such as an instant messaging program. The CA then connects the hearing-impaired party with the desired party. The CA and the hearing-impaired party may then communicate via text messages. For example, the hearing-impaired party may send instant messages to the CA, who may then relay voice messages corresponding to the instant messages to the hearing party. The CA may also receive voice messages from the hearing party and send instant messages corresponding to the voice messages to the hearing-impaired party. By using instant messaging software, the hearing-impaired party is able to communicate with other parties over existing networks.

According to one aspect of the invention, a method for providing communication services is provided. The method includes receiving a request from a hearing-impaired party for establishing a communication link to a hearing party, identifying a communication assistant and forwarding the request to the communication assistant. The method also includes establishing, by the communication assistant, a communication link to the hearing-impaired party using an instant messaging program and establishing a voice link with the hearing party. The method further includes receiving, by the communication assistant, voice messages from the hearing party via the voice link, generating instant messages corresponding to the voice messages and transmitting the instant messages to the hearing-impaired party.

According to a further aspect of the invention, a system including a server and a first device is provided. The server is configured to receive a request from a hearing-impaired party for establishing a communication link to a hearing party, identify a first communication assistant and forward the request. The first device is associated with the first communication assistant and is configured to receive the request from the server. The first device is also configured to establish a communication link to the hearing-impaired party using a text messaging program and establish a voice link with the hearing party.

Another aspect of the present invention provides a computer-readable medium that includes sequences of instructions, which when executed by a processor, cause the processor to receive a request associated with a hearing-impaired party for establishing a communication link to a hearing party. The instructions also cause the processor to establish a communication link to the hearing-impaired party using a text messaging program. The instructions further cause the processor to establish a voice link to the hearing party.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

Systems and methods consistent with the present invention extend the reach of hearing-impaired parties by allowing such parties to communicate with CAs over conventional networks, such as packet-switched networks, without requiring the use of a TDD/TTY.

System Overview

Figure 1:
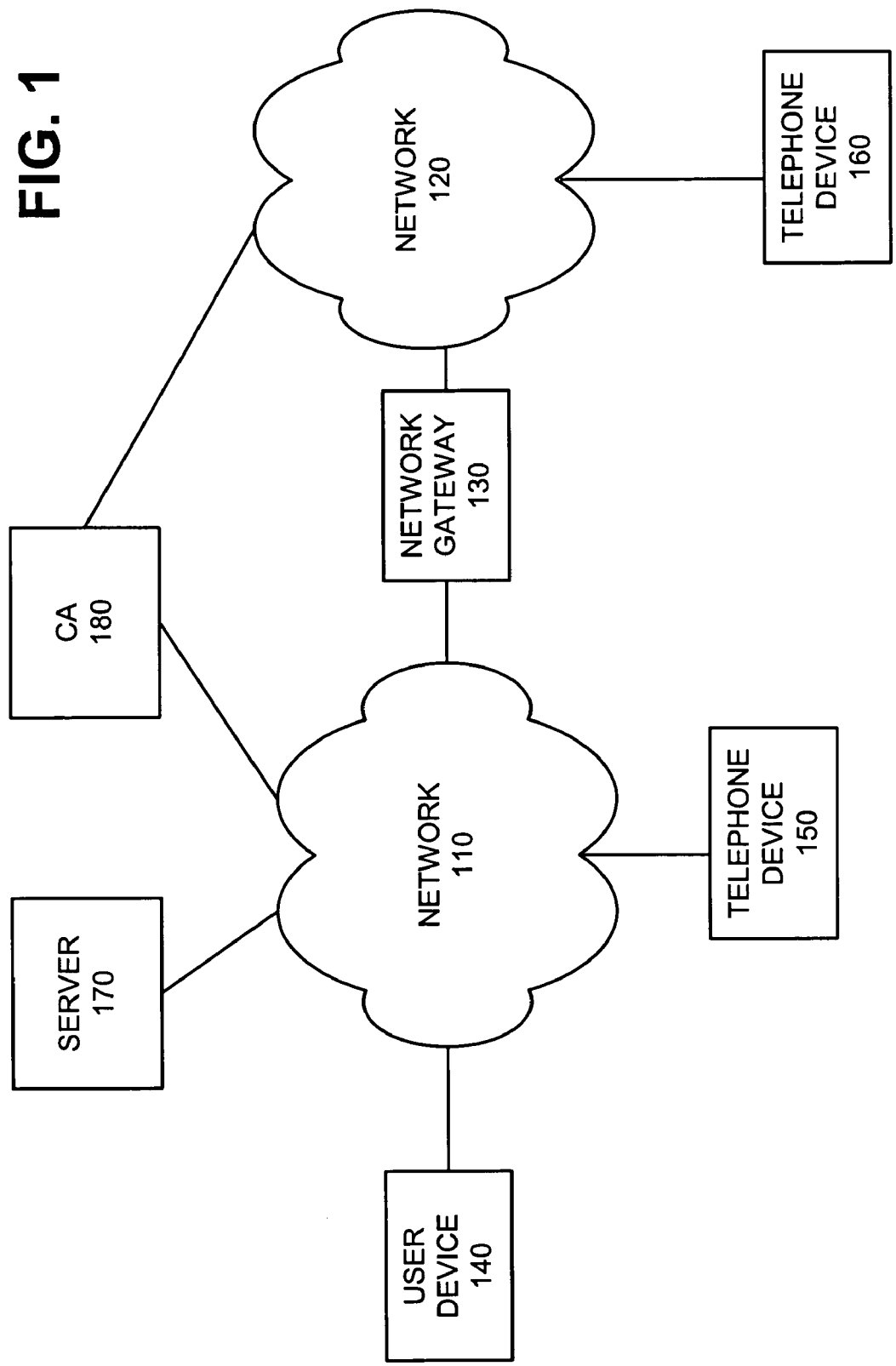
FIG. 1 is an exemplary system in which methods and systems consistent with the present invention may be implemented.

FIG. 1 is a block diagram of an exemplary system 100 in which methods and systems consistent with the present invention may be implemented. System 100 includes networks 110 and 120, network gateway 130, user device 140, telephone devices 150 and 160, server 170 and CA 180. The exemplary configuration illustrated in FIG. 1 is provided for simplicity. It should be understood that a typical system may include more or fewer devices than illustrated in FIG. 1. For example, a conference bridge device/platform that links multiple parties in a conference call and the associated telephone circuits, switching devices, software or hardware controlled devices, etc., involved in completing the conference call may be included in system 100. These devices may be used to facilitate communications involving a hearing-impaired party, a CA and a hearing party.

Network 110 may include one or more packet switched networks, such as the Internet, an intranet, a local area network (LAN), a wide area network (WAN), or another type of network that is capable of transmitting data from a source device to a destination device.

Network 120 may include one or more public switched telephone networks (PSTNs) or other type of switched network. Network 120 may also include one or more wireless networks.

Network gateway 130 may include one or more devices that allow divergent transport networks to communicate and cooperatively carry traffic. For example, network gateway 130 may provide for interoperation at two levels, e.g., between different signaling schemes and between different media forms. For example, network gateway 130 may adapt between SS7 signaling of network 120 and session initiation protocol (SIP) or H.323 protocols used by network 110. Network gateway 130 may also adapt analog or pulse code modulation (PCM) encoded voice signals to a packetized data stream suitable for transport over network 110.

User device 140, consistent with the present invention, may include any computing device that is able to execute an instant messaging software program. For example, user device may include a personal computer, a laptop, a personal digital assistant (PDA) or a web-based appliance that is able to execute a text messaging program and transmit and receive data via a network, such as network 110. User device 140 may also include any wireless device, such as a wireless telephone, that executes a wireless application protocol (WAP), or another protocol, that enables user device 140 to transmit and receive data via network 110.

Telephone device 150 may include any type of device that is capable of transmitting and receiving voice signals to/from a data network, such as network 110. For example, telephone device 150 may include any client, such as a computer device, a web-based appliance, etc., that is configured to provide telephone functions. Telephone device 150 may, for example, be a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional personal computer (PC), laptop computer or other computing device.

Telephone device 160 may include any conventional telephone, such as those used by a hearing party, that interfaces with the PSTN to place and receive telephone calls. Telephone device 160 may be a standard telephone, a cordless telephone, a cellular telephone or any other type of conventional telephone.

Server 170 may include any server/computing device that is able to connect to network 110 and transmit and receive data via network 110. Server 170, as described in more detail below, enables a hearing-impaired user to establish communications with a CA to facilitate communications with a desired party.

Figure 2:
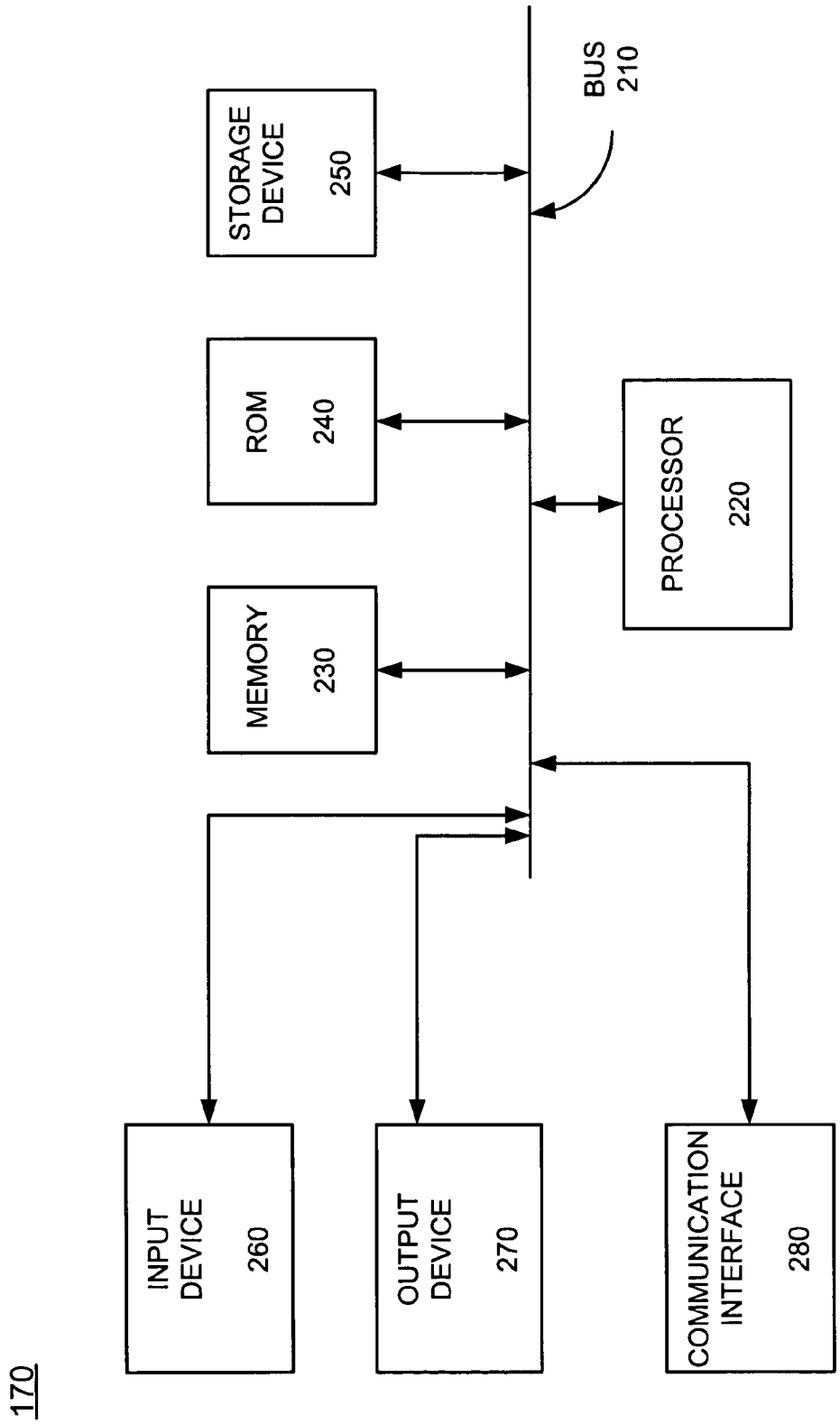
FIG. 2 is an exemplary block diagram of the server of FIG. 1 in which systems and methods consistent with the present invention may be implemented.

FIG. 2 illustrates an exemplary configuration of server 170 in an implementation consistent with the present invention. Other configurations may alternatively be used. Server 170 may include a bus 210, a processor 220, a memory 230, a read only memory (ROM) 240, a storage device 250, an input device 260, an output device 270, and a communication interface 280. Bus 210 permits communication among the components of server 170.

Processor 220 may include any type of conventional processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a conventional ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to server 170, such as a keyboard, a mouse, a pen, voice recognition and/or biometric mechanisms, etc. Output device 270 may include one or more conventional mechanisms that output information to the operator, including a display, a printer, one or more speakers, etc. Communication interface 280 may include any transceiver-like mechanism that enables server 170 to communicate with other devices and/or systems. For example, communication interface 280 may include a modem or an Ethernet interface to a LAN. Alternatively, communication interface 280 may include other mechanisms for communicating via a network.

Server 170, consistent with the present invention, provides a platform through which user device 140 may establish communications with CA 180. According to an exemplary implementation, server 170 performs processing associated with establishing communications with user device 140 in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves.

Execution of the sequences of instructions contained in memory 230 causes processor 220 to perform the acts that will be described hereafter. In alternative embodiments, hard-wired circuitry may be used in place of or in combination with software instructions to implement the present invention. Thus, the present invention is not limited to any specific combination of hardware circuitry and software.

Referring back to FIG. 1, CA 180 may represent any conventional CA workstation and operator used to facilitate communications between a hearing-impaired party and a hearing party. CA 180 may include a workstation or computer, such as a personal computer or laptop, configured in a manner similar to server 170 illustrated in FIG. 2. For example, CA 180 may include one or more processors and memory devices, a display device, an input device, such as a keyboard, a microphone, a modem, and other devices that enable CA 180 to communicate with a hearing-impaired party. CA 180, consistent with the present invention, may also include any device capable of executing a text messaging software program to transmit and receive text messages. CA 180 may be used in any telerelay services (TRS) environment, such as a voice carry over (VCO) environment, a hearing carry over (HCO) environment, a speech-to-speech (STS) environment, etc. CA 180, consistent with the present invention, may be coupled to networks 110 and 120 to facilitate communications with both hearing-impaired parties and hearing parties.

In an exemplary implementation consistent with the present invention, server 170 provides a platform for enabling a hearing-impaired party to establish communications with a CA operator, as described in more detail below. Server 170 and CA 180 are illustrated in FIG. 1 as being connected via network 110. In alternative implementations, server 170 and CA 180 may be connected directly to each other, connected via a LAN, connected via a private network, etc. In still other alternative implementations, the functions performed by server 170 and CA 180, described in more detail below, may be performed by a single device/platform.

Exemplary Processing

Figure 3:
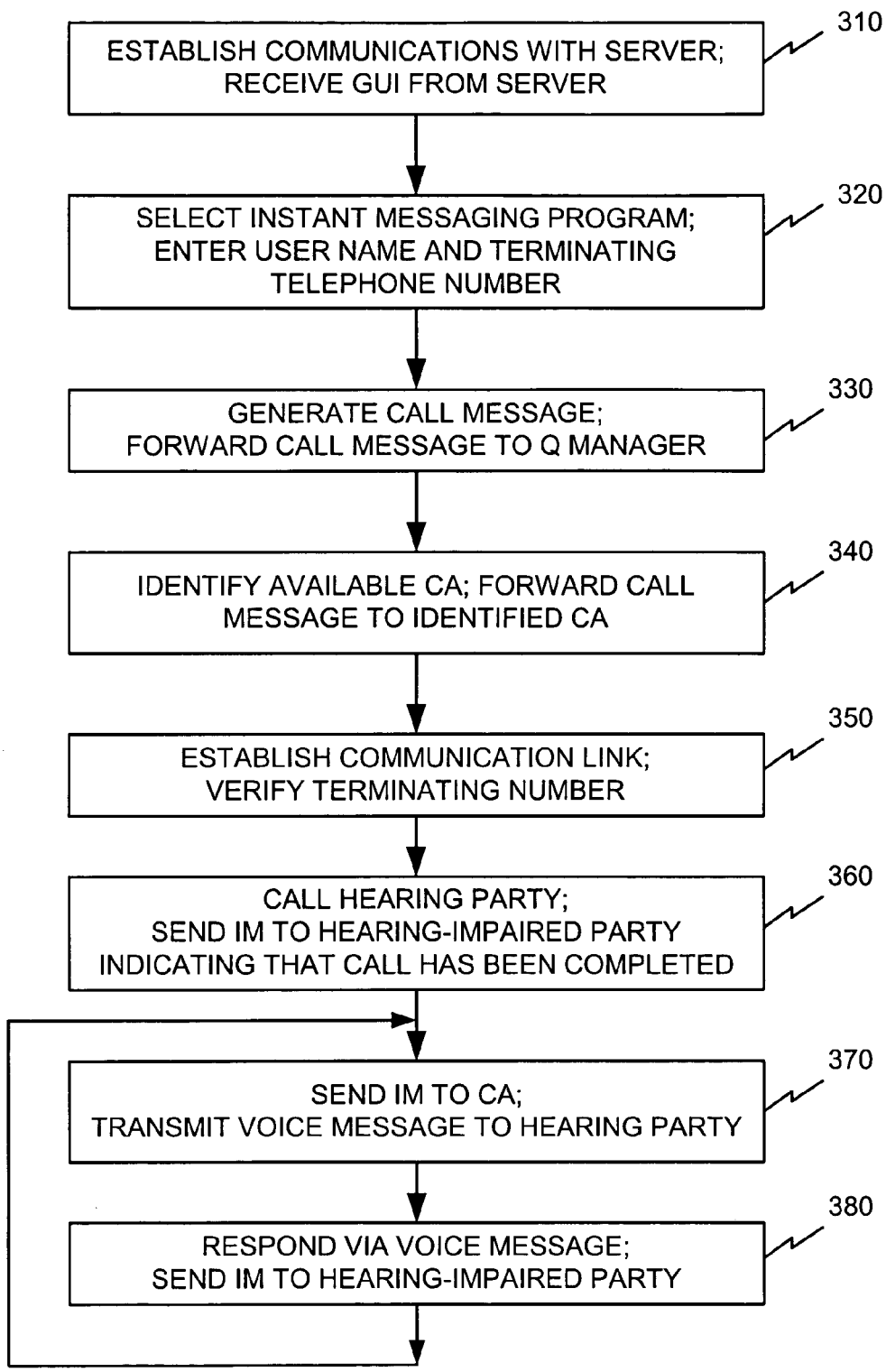
FIG. 3 is an exemplary flow diagram, consistent with the present invention, illustrating processing associated with providing communication services for a hearing-impaired party.

FIG. 3 is an exemplary flow diagram, consistent with the present invention, illustrating processing associated with establishing communications between a hearing-impaired party via user device 140 and a hearing party using telephone device 150 or 160. Assume that the hearing-impaired party wishes to establish communications with another party, such as make a telephone call, via user device 140. In this case, the hearing-impaired party may establish communications with server 170 (act 310). For example, the hearing-impaired party may enter an Internet address, such as a uniform resource locator (URL), associated with server 170 into a web browser being executed by user device 140. After establishing communications with server 170, server 170 may download a web page that includes a graphical user interface (GUI) that allows the hearing-impaired party to select an instant messaging client that may be used to facilitate communications with the desired party (act 310).

Figure 4:
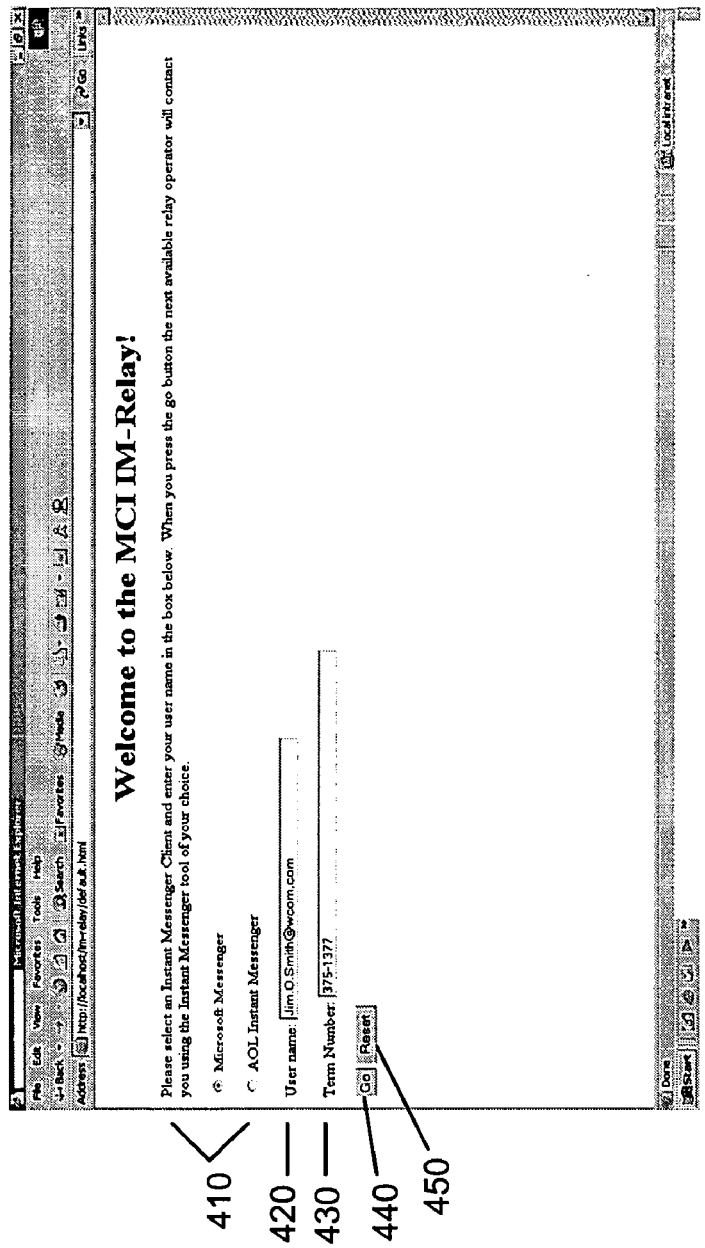
FIG. 4 is a diagram of an exemplary interface screen provided to the user device of FIG. 1, consistent with an implementation of the present invention.

For example, FIG. 4 illustrates an exemplary GUI screen 400 that may be downloaded to user device 140 by server 170. Referring to FIG. 4, GUI 400 includes an instant messaging selection area 410, a user name area 420, a terminating telephone number area 430, a "Go" button 440 and a "Reset" button 450. The hearing-impaired party may select the desired instant messaging client that he/she wishes to use (act 320). In the exemplary GUI 400, the instant messaging clients include Microsoft Messenger and AOL Instant Messenger. It should be understood that other instant messaging clients may also be provided in other implementations consistent with the present invention. The hearing-impaired party may also enter a user name or identifier in user name area 420 (act 320). The user name may, for example, be the hearing-impaired party's e-mail address. The hearing-impaired party may also enter a terminating telephone number in area 430, which represents the telephone number of the party that the hearing-impaired party would like to call (act 320). The hearing-impaired party may then select the "Go" button 440 to transmit the information on GUI 400 to server 170. Alternatively, the hearing-impaired party may select reset 450 to clear GUI 400 and re-enter the data in areas 410–430.

Server 170 receives the information on GUI 400 and reads the information. Server 170 may reformat the received information and generate a call message for transmission to a queue manager process, referred to hereafter as the Q manager (act 330). The Q manager process may be executed by server 170. Alternatively, the Q manager process may be executed by another device coupled to server 170. In this case, server 170 may send the call message to the Q manager over a transmission control protocol/Internet protocol (TCP/IP) connection.

In either case, after server 170 generates the call message, server 170 may send an acknowledgement message to user device 140 indicating that the call request was received. The Q manager receives the call message and may search a table containing a list of CAs and their respective statuses. For example, the status of each CA may indicate whether that particular CA is busy with a current call, is off-line/not available or is available to help a caller. The table may be stored, for example, in storage device 250. Alternatively, when the Q manager is being executed by a device external to server 170, the table of CAs may be stored in a storage device accessible to the Q manager. In each case, the Q manager may identify and select a CA to assist the hearing-impaired user (act 340).

After selecting an available CA, the Q manager may set the status of the selected CA to "busy" and forward the call request message to the selected CA. For example, suppose that the selected CA corresponds to CA 180. In this case, CA 180 receives the call request message and outputs a signal to the operator associated with CA 180 indicating that a call request has been received. The signal to the operator may be audible, visual or a combination of audible/visual signals, to alert the operator that a call has been received. The console/display associated with CA 180 may indicate which instant messaging client the hearing-impaired party selected, the terminating telephone number and the user ID provided by the hearing-impaired party at act 320.

The operator associated with CA 180 may select an "activate client" button associated with the instant messaging client selected by the hearing-impaired user. Alternatively, the appropriate instant messaging client may be automatically selected based on information in the call request message. In either case, a screen or window corresponding to the selected instant messaging client may then be "popped" or displayed on CA 180 with the user ID of the hearing-impaired party being pre-selected. In other words, if AOL Instant Messenger is selected, CA 180 will execute or launch AOL Instant Messenger and the hearing-impaired party's email address will be pre-loaded to facilitate communications with the hearing-impaired party. The operator of CA 180 may key in a greeting message, such as "I am ready to assist you," and press "send" on his/her client window to establish a text communications link with the hearing-impaired user (act 350). The communications link may be a conventional instant messaging link that allows CA 180 to communicate with user device 140 via instant messaging and details of such links will not be described herein in order not to unduly obscure the thrust of the present invention.

The operator of CA 180 may also "chat" (i.e., via instant messaging) with the hearing-impaired party via the instant messaging client to verify the terminating telephone number that the hearing-impaired party wishes to contact (act 350). For example, the operator of CA 180 may type in a text message, also referred to as an instant message (IM), such as "The number you wish to connect to is 555-375-1377. Is that correct?" CA 180 may then transmit the IM to user device 140.

After receiving verification regarding the terminating telephone number from the hearing-impaired party, the operator of CA 180 may dial the terminating telephone number (act 360). In this example, assume that the terminating telephone number is associated with telephone device 160. Further assume that a hearing party at telephone device 160 answers the call. In this case, CA 180 may provide a voice greeting to the hearing party informing the hearing party that a telephone call from a hearing-impaired person is to commence, along with the name and other information associated with the hearing-impaired party. The name may correspond to the user name provided at area 420 in GUI 400. Alternatively, the name may have been provided by the hearing-impaired party via earlier instant messaging between the hearing-impaired party and CA 180. The operator of CA 180 may also send an instant message (IM) to user device 140 indicating that the call has been established to the terminating party, i.e., the hearing party (act 360).

The hearing-impaired party may then send an IM to CA 180 via user device 140 (act 370). The IM may be a typical message that the hearing-impaired party wishes to communicate to the hearing party, such as "Hi Bill, this is Jim, how are you doing?" When CA 180 receives the IM, the operator associated with CA 180 voices a message corresponding to the IM to the terminating party (i.e., the hearing party) at telephone device 160 (act 370).

The hearing party may then respond to CA 180 via a conventional voice message (act 380). The operator associated with CA 180 receives the voice message and may then type the text corresponding to the voice message and IM the hearing-impaired party at user device 140 (act 380). The "conversation" between the hearing-impaired party and the hearing party may continue in this manner as discussed above with respect to acts 370 and 380, with CA 180 instant messaging with the hearing-impaired party at user device 140 to facilitate the conversation. That is, each time the hearing party responds with a voice message, CA 180 types an IM and transmits the IM to user device 140 and each time the hearing-impaired party sends an IM, CA 180 voices a message to the hearing party corresponding to the IM.

In situations in which the hearing-impaired party can speak (e.g., a VCO environment), the responsible service provider (e.g., the local telephone company, a long distance telephone provider, etc.) may establish a conference call between the three parties (i.e., the hearing-impaired party, the hearing party and CA 180) via a conventional conference bridge. The conference bridge may allow the hearing-impaired party to communicate voice messages directly to the hearing party, without CA 180 relaying the intended voice message. CA 180, however, may still IM user device 140 with text messages based on the responses of the hearing party. In this case, user device 140 may also have a connection to network 120, either directly or via CA 180. Alternatively, CA 180 and the hearing-impaired party at user device 140 may establish a voice over Internet Protocol (VoIP) connection and the terminating party may audio-conference in via the connection to CA 180.

Further, in an HCO environment, the party at user device 140 may be able to hear, but not speak. In this case, CA 180 may only be needed to generate voice messages based on IMs from user device 140. In an STS environment, the party at user device 140 may have speaking problems. In this case, CA 180 may receive voice messages from the speech-impaired party and re-voice the messages to the hearing party. CA 180 and the speech-impaired party may use the instant messaging client to ensure that the CA 180 clearly understands the speech-impaired party.

In the manner described above, a hearing-impaired user and a hearing user may communicate without the use of a TDD/TTY, thereby extending the reach of the hearing-impaired party. In addition, in the example described above, the hearing-impaired party connects to a hearing-party at telephone device 160. In alternative implementations, the hearing-impaired party may connect to a hearing party at telephone device 150. As described above, telephone device 150 may be a SIP-based telephone device or another telephone device that communicates over a packet-switched network, such as the Internet. In this case, VoIP may be used to provide voice connections from CA 180 and user device 140 to telephone device 150.

Systems and methods consistent with the present invention facilitate communications between hearing-impaired parties and hearing parties. An advantage of the invention is that hearing-impaired parties and other parties are able to initiate communications using any device that is capable of executing an instant messaging software program. Another advantage of the present invention is that the typical speed with which instant messaging traffic is exchanged enables the hearing-impaired party to effectively communicate with the desired third party in a near real-time manner with very little delays between communications.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, the present invention has been described with the example of a CA operator manually typing text messages corresponding to voice messages from a hearing party. In alternative implementations, voice recognition software may be used to automatically generate text messages based on the received voice messages and automatically send the text messages via the instant messaging program. Further, the IMs received by a CA may be automatically translated into voice messages using text-to-voice software. This may eliminate the need for a human operator at CA workstations. Thus, the present invention is not limited to any specific combination of hardware circuitry and/or software.

In addition, the present invention has been described with the example of a hearing-impaired party initiating a telephone call to a hearing party. The acts described in relation to FIG. 3 are similarly applicable if the hearing party initiates the call to a hearing-impaired party. Further, the present invention may also be implemented using a single instant messaging client available on a common server to route connections to a CA, instead of providing the user with a choice of instant messaging clients.

Further, the present invention has been described mainly with respect to using an instant messaging program for facilitating communications between a hearing-impaired party and another party. In other implementations, other types of text messaging programs may be used. For example, text messaging programs that permit users to communicate via a persistent, full-duplex connection may be used in implementations of the present invention. Such text messaging programs may be implemented on a wireless device, such as a wireless telephone, a PDA or another type of user device.

In this case, the connection between the hearing-impaired party and the CA may be full duplex such that the hearing-impaired party and the CA may be able to see what each other are typing in real-time or near real-time. This helps prevent the hearing-impaired party and the CA from getting out of synchronization when communicating with each other, which may occur when using instant messaging. This may also result in the increased use of services of a CA since the text-based conversation between the hearing-impaired party and the hearing party may take place in a very efficient manner.

Lastly, a series of acts has been described with respect to FIG. 3. The order of the acts may be varied in other implementations consistent with the present invention. Moreover, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for providing communication services, comprising:
   receiving, via a network, a request from a hearing-impaired party for establishing a communication link to a hearing party;
   transmitting, via the network, an interface screen to the hearing-impaired party in response to the request, the interface screen identifying a plurality of instant messaging programs and including a selection area for allowing the hearing-impaired party to select an instant messaging program with which to communicate;
   identifying a communication assistant;
   forwarding the request to the communication assistant;
   establishing, by the communication assistant, a communication link to the hearing-impaired party using the instant messaging program selected by the hearing-impaired party;
   establishing, by the communication assistant, a voice link with the hearing party;
   receiving, by the communication assistant, voice messages from the hearing party via the voice link;
   generating instant messages, by the communication assistant, the instant messages corresponding to the voice messages; and
   transmitting the instant messages to the hearing-impaired party.

2. The method of claim 1, further comprising:
   receiving, by the communication assistant, instant messages from the hearing-impaired party; and
   transmitting, by the communication assistant, voice messages to the hearing party, the voice messages corresponding to the received instant messages.

3. The method of claim 1, wherein the request from the hearing-impaired party is received via a packet-switched network from a device executing an instant messaging program.

4. The method of claim 1, wherein the request from the hearing-impaired party is received via the Internet.

5. The method of claim 1, wherein the interface screen includes a telephone number input area for allowing the hearing-impaired party to input a telephone number for the hearing party.

6. The method of claim 5 wherein the interface screen includes a user name area for allowing the hearing-impaired party to input an e-mail address identifying an address to which the communication assistant will send instant messages.

7. The method of claim 1, wherein the voice link from the communication assistant to the hearing party comprises a voice over Internet Protocol link.

8. The method of claim 1, further comprising:
   establishing a conference call between the hearing-impaired party, the communication assistant and the hearing party, the conference call utilizing voice over Internet Protocol.

9. The method of claim 1, wherein the network comprises the Internet.

10. A system, comprising:
    a server configured to:
       receive, via a network, a request from a hearing-impaired party for establishing a communication link to a hearing party,
       transmit, via the network, an interface screen to a hearing-impaired party in response to the request, the interface screen identifying a plurality of instant messaging programs and allowing the hearing-impaired party to select an instant messaging program with which to communicate,
       identify a first communication assistant, and
       forward the request; and
    a first device associated with the first communication assistant, the first device being configured to:
       receive the request from the server,
       establish a communication link to the hearing-impaired party using the instant messaging program selected by the hearing-impaired party, and
       establish a voice link with the hearing party.

11. The system of claim 10, wherein the interface screen includes a first area for allowing the hearing-impaired party to input a telephone number for the hearing party.

12. The system of claim 11, wherein the interface screen includes a second area for allowing the hearing-impaired party to input an e-mail address identifying an address to which the first communication assistant will send instant messages.

13. The system of claim 10, wherein the first device comprises a workstation, the first device being further configured to:
    receive voice messages from the hearing party via the voice link, and
    transmit instant messages to the hearing-impaired party, the instant messages being input by the first communication assistant and corresponding to the received voice messages.

14. The system of claim 13, wherein the first device is further configured to:

receive instant messages from the hearing-impaired party, and transmit voice messages to the hearing party, the transmitted voice messages corresponding to the received instant messages.

15. The system of claim 10, wherein the request from the hearing-impaired party is received via a packet-switched network from a device executing an instant messaging program.

16. The system of claim 10, wherein the request from the hearing-impaired party is received via the Internet.

17. The system of claim 10, wherein the first device is further configured to establish the voice link from the first communication assistant to the hearing party using voice over Internet Protocol.

18. The system of claim 10, wherein the first device is further configured to:

establish a conference call between the hearing-impaired party, the first communication assistant and the hearing party, the conference call utilizing voice over Internet Protocol.

19. The system of claim 18, wherein the conference call is configured to link the hearing-impaired party, the first communication assistant and the hearing party in at least one of a hearing carry over environment, a voice carry over environment or a speech-to-speech environment.

20. A computer-readable medium having stored thereon a plurality of sequences of instructions, said sequences of instructions including sequences of instructions which, when executed by a processor, cause said processor to:

receive, via a network, a request associated with a hearing-impaired party for establishing a communication link to a hearing party;

transmit, via the network, an interface screen to the hearing-impaired party in response to the request, the interface screen including an input area for allowing the hearing-impaired party to select an instant messaging program from a plurality of instant messaging programs;

establish a communication link to the hearing-impaired party using the instant messaging program selected by the hearing-impaired party via the interface screen; and establish a voice link to the hearing party.

21. The computer-readable medium of claim 20, including instructions for further causing the processor to:

receive voice messages from the hearing party via the voice link; and transmit, in response to received voice messages, instant messages to the hearing-impaired party, the instant messages corresponding to the voice messages.

22. The computer-readable medium of claim 20, including instructions for further causing the processor to:

receive instant messages from the hearing-impaired party; and display the instant messages.

23. The computer-readable medium of claim 20, including instructions for further causing the processor to:

receive voice messages from the hearing party via the voice link;

automatically generate instant messages corresponding to the voice messages;

transmit the instant messages to the hearing-impaired party;

receive instant messages from the hearing-impaired party;

automatically generate voice messages corresponding to the received instant messages; and transmit the voice messages to the hearing party.

24. The computer-readable medium of claim 20, wherein when establishing a voice link, the instructions cause the processor to:

establish the voice link using voice over Internet Protocol.

25. The computer-readable medium of claim 20, wherein when establishing a voice link, the instructions further cause the processor to:

establish a conference call between the hearing-impaired party, a communication assistant and the hearing party, the voice link utilizing at least one of the Internet or the public switched telephone network.

26. A system, comprising:

means for receiving, via a network, a request from a hearing-impaired party for establishing a communication link to a hearing party; and means for transmitting, via the network, an interface screen to the hearing-impaired party in response to the request, the interface screen including an input area for allowing the hearing-impaired party to input a telephone number for the hearing party and a selection area for allowing the hearing-impaired party to select a text messaging program with which to communicate.

27. The system of claim 26, wherein the interface screen includes a user name area for allowing the hearing-impaired party to input an address to which a communication assistant will send text messages.

28. The system of claim 26, further comprising:

means for identifying a communication assistant to assist the hearing-impaired party; and means for forwarding the request to the identified communication assistant.

29. A method, comprising:

receiving, via a network, a request from a hearing-impaired party for establishing a communication link to a hearing party; and transmitting, via the network, an interface screen to the hearing-impaired party in response to the request, the interface screen identifying a plurality of text messaging programs and including a selection area for allowing the hearing-impaired party to select a first text messaging program from the plurality of text messaging programs with which to communicate with a communication assistant.

30. The method of claim 29, further comprising:

establishing a communication link from the communication assistant to the hearing-impaired party; and communicating with the hearing-impaired party via instant messages.

31. The method of claim 29, further comprising:

establishing a full duplex communication link with the hearing-impaired party; and communicating with the hearing-impaired party over the full duplex communication link using text messages.

32. The method of claim 29, wherein the request from the hearing-impaired party is received via a wireless telephone or a personal digital assistant and the interface screen is transmitted to the wireless telephone or the personal digital assistant.

33. The method of claim 29, wherein the network comprises the Internet.

* * * * *